(12) United States Patent
Iyengar et al.

(10) Patent No.: US 8,977,845 B2
(45) Date of Patent: Mar. 10, 2015

(54) METHODS AND APPARATUS FOR ACCESS CONTROL IN SERVICE-ORIENTED COMPUTING ENVIRONMENTS

(75) Inventors: Arun Kwangil Iyengar, Yorktown Heights, NY (US); Thomas A. Mikalsen, Cold Spring, NY (US); Isabelle Marie Rouvellou, New York, NY (US); Mudhakar Srivalso, Atlanta, GA (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1965 days.

(21) Appl. No.: 11/734,319

(22) Filed: Apr. 12, 2007

(65) Prior Publication Data
US 2008/0256357 A1 Oct. 16, 2008

(51) Int. Cl.
*H04L 9/32* (2006.01)
*H04L 29/06* (2006.01)
*G06F 21/31* (2013.01)

(52) U.S. Cl.
CPC .............. *H04L 63/102* (2013.01); *G06F 21/31* (2013.01); *G06F 2221/2105* (2013.01); *G06F 2221/2119* (2013.01)
USPC .......................................... 713/155; 713/153

(58) Field of Classification Search
CPC ............ G06F 21/31; G06F 2221/2105; G06F 2221/2119; H04L 63/102
USPC .............. 726/9, 26, 27, 28, 29; 713/224, 201, 713/212, 213, 220, 223
See application file for complete search history.

(56) References Cited

U.S. PATENT DOCUMENTS

| | | | |
|---|---|---|---|
| 2006/0021019 A1* | 1/2006 | Hinton et al. | 726/10 |
| 2006/0069717 A1* | 3/2006 | Mamou et al. | 709/203 |
| 2008/0141336 A1* | 6/2008 | Haller | 726/1 |
| 2009/0254392 A1* | 10/2009 | Zander | 705/7 |

OTHER PUBLICATIONS

E.G. Sirer et al., "An Access Control Language for Web Services," SACMAT, Jun. 2002, 8 pages.

(Continued)

*Primary Examiner* — Jeffrey Pwu
*Assistant Examiner* — Nega Woldemariam
(74) *Attorney, Agent, or Firm* — Preston Young; Ryan, Mason & Lewis, LLP (57) ABSTRACT

Improved access control techniques for use in a service-oriented computing environment are disclosed. For example, one method for authenticating a client in a service-oriented environment, wherein the service-oriented environment includes a plurality of services, includes the following steps. At least one service of the plurality of services is invoked. State information is associated with the at least one service invoked. The state information is used to authenticate a client with at least one service. Further, a method for access control in a service-oriented environment, wherein the service-oriented environment includes a plurality of services, includes the following steps. A rule specification language is provided. At least one rule is specified using the rule specification language. A verification is performed to determine whether or not the client satisfies the at least one rule. The client is granted access to a service when the client satisfies the at least one rule.

17 Claims, 5 Drawing Sheets

(56) References Cited

OTHER PUBLICATIONS

M. Mecella et al., "Access Control Enforcement for Conversation-Based Web Services," www2006, May 2006, 10 pages.

B. Carminati et al., "Security Conscious Web Service Composition," IEEE International Conference on Web Services (ICWS), 2006, 8 pages.

* cited by examiner

$\psi_0$ = employee
$\psi_4 = \psi_1 \wedge \psi_3$
$\psi_8 = F^{-1}\psi_7$
$\psi_{12} = \psi_8 \Rightarrow \psi_{11}$
$\psi_{16}$ = retail service
$\psi_{20}$ = chief manager $\psi_1 = F^{-1}\psi_0$
$\psi_5$ = ordercost(cost, c)
$\psi_9$ = manufacturer(M)
$\psi_{13} = \psi_6 \wedge \psi_{12}$
$\psi_{17} = X^{-1}\psi_{16}$
$\psi_{21} = F^{-1}\psi_{20}$ $\psi_2$ = retail service
$\psi_6 = \psi_4 \wedge \psi_5$
$\psi_{10}$ = purchase(itemID, M)
$\psi_{14}$ = retail manager
$\psi_{18} = \psi_{15} \wedge \psi_{17}$
$\psi_{22} = \psi_{19} \vee \psi_{21}$ $\psi_3 = X^{-1}\psi_2$
$\psi_7$ = employee(M)
$\psi_{11} = \psi_9 \wedge \psi_{10}$
$\psi_{15} = F^{-1}\psi_{14}$
$\psi_{19} = \psi_{13} \vee \psi_{18}$

METHODS AND APPARATUS FOR ACCESS CONTROL IN SERVICE-ORIENTED COMPUTING ENVIRONMENTS

FIELD OF THE INVENTION

The present invention relates to service-oriented computing environments and, more particularly, to techniques for client authentication in such service-oriented computing environments.

BACKGROUND OF THE INVENTION

Service-oriented Computing (SOC) has emerged as a widely accepted paradigm for building large and complex web applications. Recently, service-oriented architectures have been used to build several Internet based business applications. Web services have become a widely accepted standard-based instantiation of service-oriented computing as a viable platform for integrating scientific as well as business applications that operate in distributed and heterogeneous environments.

As is known, the World Wide Web Consortium (W3C) defines a web service as a software system designed to support interoperable machine to machine interaction over a network. Web services are frequently merely web application programming interfaces (APIs) that can be accessed over a network, such as the Internet, and executed on a remote system hosting the requested services. The W3C web service definition encompasses many different systems, but in common usage the term refers to clients and servers that communicate Extensible Markup Language (XML) messages that follow the Simple Object Access Protocol (SOAP) standard.

In this setting, service composition has been heavily used for implementing complex, massively distributed applications that span multiple autonomous organizations. Hence, it becomes very important to be able to control the security properties of such compositions in order to guarantee security in such applications.

The goal of an access control model in a web service application is to answer the following yes or no question: can a principle P invoke a method M on service S? In an application built using service composition it is difficult to define the calling principle P since the request might have propagated along multiple hops (through different principles and services). For instance, consider a supply chain management (SCM) application composed of three entities: customers, a retailer system and a manufacturer system. A retailer system may include a retail manager role and a composition of three services: a retail service, a warehouse service and a database service. In a SCM application, we need to distinguish a retail manager accessing the database service through the retail service and a retail manager accessing the database service through the warehouse service. While the former may have retail manager-like privileges on the database service, the later may have only employee-like privileges.

WS-Security is a communications protocol that provides a mechanism for applying security to web services. More particularly, WS-Security describes enhancements to SOAP messaging to provide message integrity, confidentiality, and single message authentication in a way that can accommodate a wide variety of security models and encryption technologies. WS-Policy provides a general purpose model and a specification language to describe and communicate the policies of a web service. WS-Security Policy, built on the WS-Policy and the WS-Policy Assertion protocols, is a declarative XML format for programming the precise techniques used by web service implementations to construct and check WS-Security headers.

Unfortunately, most of these methodologies treat applications and services as monolithic entities. None of these models treat service composition as a first class entity or provide constructs for specifying security policies for web service compositions. Further, there is no unified methodology for expressing and enforcing access control rules in large and complex web service compositions.

Accordingly, improved access control techniques for use in a service-oriented computing environment are needed.

SUMMARY OF THE INVENTION

Principles of the invention provide improved access control techniques for use in a service-oriented computing environment.

For example, in one aspect of the invention, a method for authenticating a client in a service-oriented environment, wherein the service-oriented environment includes a plurality of services, includes the following steps. At least one service of the plurality of services is invoked. State information is associated with the at least one service invoked. The state information is used to authenticate a client with at least one service.

In another aspect of the invention, a method for access control in a service-oriented environment, wherein the service-oriented environment includes a plurality of services, includes the following steps. A rule specification language is provided. At least one rule is specified using the rule specification language. A verification is performed to determine whether or not the client satisfies the at least one rule. The client is granted access to a service when the client satisfies the at least one rule.

These and other objects, features and advantages of the present invention will become apparent from the following detailed description of illustrative embodiments thereof which is to be read in connection with the accompanying drawings.

DETAILED DESCRIPTION OF PREFERRED EMBODIMENTS

As mentioned above, service composition has emerged as a fundamental technique for developing large and complex web applications. Multiple services, often from different organizations (or trust domains), may be dynamically composed to satisfy a request of a user. Such service compositions tend to be recursive and may include several sub-services and partner services. Access control in large service compositions is a very challenging security problem.

Accordingly, the present invention provide an access control model and techniques for specifying and enforcing access control rules on web service compositions. We define the notion of a composite principle to capture temporal, causal and privilege information that we believe are required to enforce access control rules on service compositions. Our definition of a composite principle allows us to inter-operate with organizational role hierarchy and to efficiently specify and enforce scoped separation of duty constraints and scoped roles. We describe a pure-past linear temporal logic (PPLTL) based declarative policy specification language for expressing these access control policies. We illustrate our approach using examples from a supply chain management (SCM) application. We describe an implementation of our proposal on an application overlay network (AON) based implementation of the SCM application.

The remainder of the detailed description is divided as follows.

In Section 1, we study the requirements for access control policies for web service compositions using a supply chain management (SCM) application. We demonstrate that existing access control models do not meet these requirements since they do not explicitly support the notion of service composition.

In Section 2, we handle this shortcoming by defining the notion of a composite principle. A composite principle captures temporal, causal and privilege information that we believe are required to enforce access control rules on service compositions. We use composite principles as first class entities to construct our access control model, that is, we answer the following yes or no question: can a composite principle CP invoke a method M on service S? We use a role based access control (RBAC) model for specifying privilege information and demonstrate that one can easily model complex access control rules based on separation of duty constraints (with scopes), inter-organizational roles (with scopes) using the notion of composite principles.

In Section 3, we describe a formal access control specification language for describing access control policies on service compositions. We describe a pure-past linear temporal logic (PPLTL) based declarative policy specification language for describing access control policies on composite principles. We introduce role monotone checks to ensure that a PPLTL rule respects the organizational role hierarchy. We also represent constraints on inter-organizational web service invocations as PPLTL rules on scoped composite roles and role translation tables. We use dynamic instantiation of PPLTL rules to support scoped separation of duty constraints and scoped roles. We show encodings of some sample access control policies from the supply chain management application.

In Section 4, we describe an implementation of our access control mechanism as a middleware service on an application overlay network (AON) hosting a SCM application. Our implementation is highly modular and allows easy deployment and enforcement of access control policies.

In Section 5, we describe authentication methodologies of the invention and a computer system architecture for implementing such methodologies.

1. Access Control Requirements

In this section we consider several access control requirements for web service compositions with illustrations from the supply chain management (SCM) application.

Figure 1:
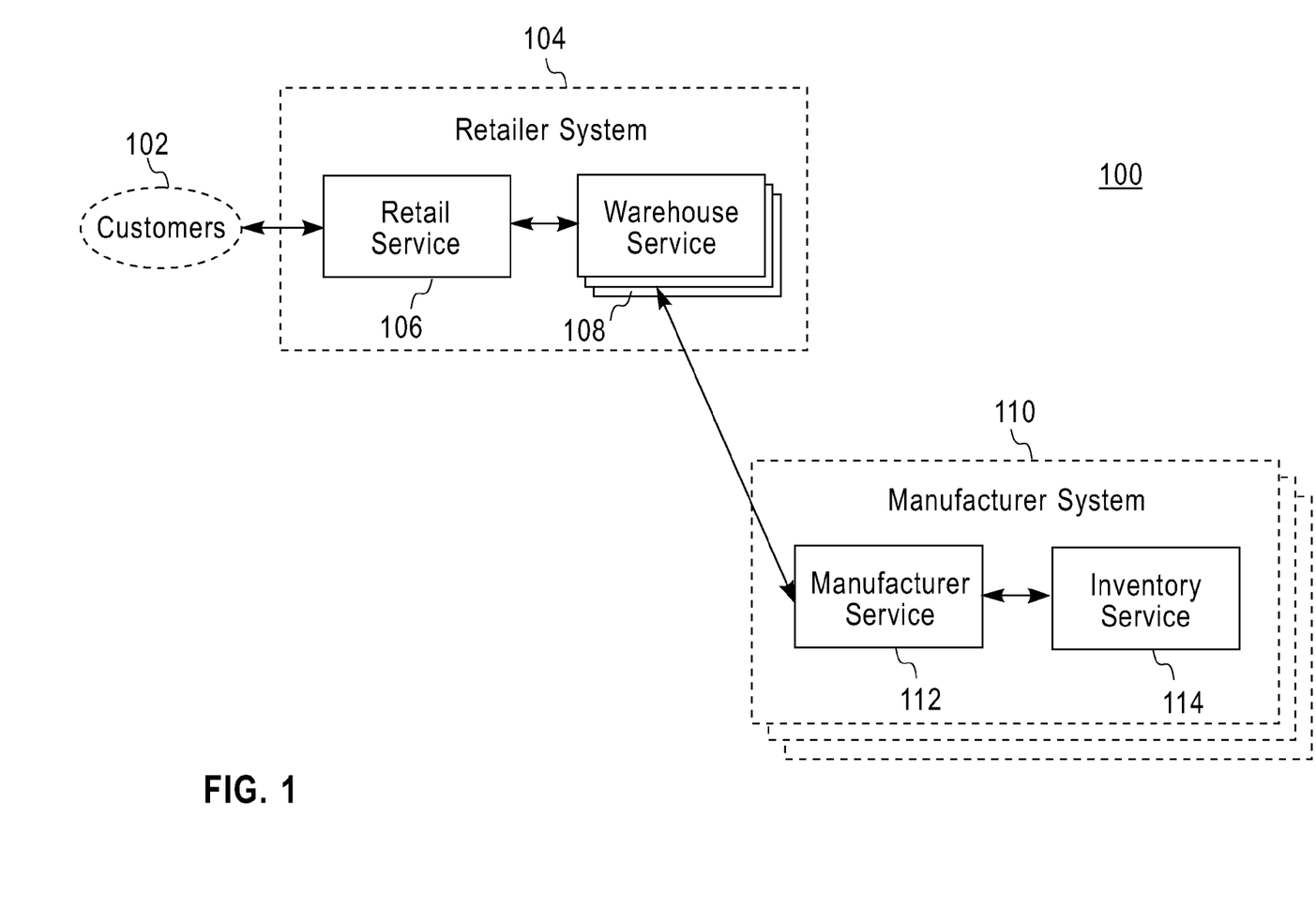
FIG. 1 illustrates a supply chain management application with which techniques of the invention may be implemented in accordance with an embodiment thereof.

FIG. 1 illustrates the SCM application. A SCM application typically includes at least three systems. As shown, SCM application 100 includes customer(s) 102, retailer system 104, and manufacturer system 110. Each system refers to an autonomous organization or a trust domain. The retailer system is composed of the following services: retailer service 106, and one or more warehouse services 108. The manufacturer system is composed of the following services: inventory service 114 and manufacturer service 112. In addition, all systems include a standard set of services including: a binding or gateway service, a database service and an audit or logging service.

1.1 Concrete Requirements

As mentioned above, in an application built using service compositions, it is difficult to define the calling principle P since the request might have propagated along multiple hops (through different principles and services). A principle refers to a subject or an automated agent (Web service). However, the calling principle is limited to the set of principles and services that have participated in the call invocation history. The primary requirement here is to maintain minimal and yet sufficient information about the call invocation history such that one can determine the privilege information for a request after multiple service invocations. We define the notion of a composite principle to capture temporal, causal and privilege information that we believe would enable us to capture the required information. Our access control model accepts a composite principle CP and decides whether CP can invoke a method M on service S. We use a RBAC model to encode privilege information into a composite principle.

In addition, we provide a set of new access control features specifically designed for service compositions:

Support temporal predicates on a composite principle: Recall that in a SCM application, we need to be able to distinguish between a retail manager accessing the database service through the retail service from a retail manager accessing the database service through the warehouse service. Temporal predicates allow us to capture the fact that a request was initiated by a retail manager and subsequently handled by the retail service. In general, temporal predicates on composite principles allow us to formalize the temporal concepts such as sometime in the past, subsequently, last time}, since.

Support temporal predicates on multiple composite principles for handling separation of duty constraints: In the SCM application, an employee cannot approve an order if the same employee had approved the payment of the order in the past. In this case, the order activity includes one or more temporally ordered sequence of service invocations. The first set of invocations approve a payment of an order and the second set of invocations attempt to approve the order. Each sequence of service invocation has an associated composite principle, say $CP_{pay}$ and $CP_{app}$, respectively, with the temporal constraint: $CP_{pay}$ happened sometime in the past and subsequently $CP_{app}$ attempts to approve and commit the order.

Support scoped access control rules: Recall that in the SCM application, an employee can approve an order $o_1$ and approve the payment for an order $o_2$ if $o_1 \neq o_2$. Scoping allows parameterization of the access control rule say, using a unique order identifier (ID) in this case. This permits the separation of duty constraint to be imposed only within the scope of a unique order ID.

Support the inter-organizational roles using role translation: Role translation permits a role in one organization to be recognized by another organization. In a SCM application, a retailer R may permit a manufacturer M to inspect its inventory database. In this case, the retailer R needs to recognize a role (say, inventory manager) from the manufacturer M and translate it to an appropriate role in its trust domain (say, an employee). This allows an inventory manager from M to operate with employee-like privileges on the retailer service managed by R.

Support the notion of scoped roles to restrict the privileges of translated roles: Let us suppose that an inventory manager in a manufacturer M is given the status of a warehouse employee by a retailer R. However, one should ensure that such an employee should be not able to inspect the inventory level of all items in the warehouse of the retailer. Instead such an employee has to be tagged with the manufacturer M's ID and its privileges be scoped to only those items purchased by the retailer R from the manufacturer M.

Support a flexible and efficient access control policy specification language: Finally, we need a flexible access control policy specification language that is expressive enough to accommodate all the required features listed above. Further, it must be possible to efficiently reason about the truth or falsity of rules written in the access control language. Since dynamic access control checks are performed in the critical path of an application it is very important to ensure that they incur only a small performance penalty.

Apart from the above features which are specifically designed for service compositions, we support standard Boolean predicates for data driven access control. For example, a SCM application may impose constraints on the set of methods that could be invoked by a given role. Further, a SCM application may impose data driven access control rules on service invocations: for example, an employee cannot approve an order if the order cost is larger than a threshold c. Such constraints can be easily represented as simple Boolean predicates on roles, method names and method argument values.

2. Access Control Model

2.1 Composite Roles and Composite Principles

A composite principle (CP) allows us to reason about web service compositions as first class entities. Informally, a composite role includes a temporally ordered sequence of roles and services that are involved in an activity. Similarly, a composite principle includes a temporally order sequence of principles (playing a certain role) and service instances (acting as a certain service) that are involved in an activity. Concretely, a composite role and a composite principle are represented in BNF (Backus-Naur form) as shown below.

$$CR := (S|R)^+$$

$$CP := (S\text{ }as\text{ }S|P\text{ }as\text{ }R)^+$$

Temporal Constraint: For example, composite roles capture the fact that a write on the order database table is performed by CR=(customer, retail service). The statement CR=(customer, retail service) invokes a method M on the database service should be read as: a customer operating via the retail service invoked a method M on the database service. This allows us to explicitly deny write operations on the database to temporally (and causally) incorrect composite roles $CR_1$=(customer) and $CR^2$=(retail service).

Role/Privilege Constraint: Apart from capturing temporal information, a composite role captures privilege (role) information. This helps us distinguish read operation on the order database table by $CR_4$=(retail manager, retail service) and $CR_5$=(retail manager, warehouse service). Indeed, we can permit $CR_4$ to have retail manager-like privileges on the database service, while $CR_5$ only has employee-like privileges on the database service. Similarly, one can ensure that $CR_6$=(warehouse manager, retail service) has only employee-like privileges on the database service, while $CR_7$=(warehouse manager, warehouse service) has warehouse manager-like privileges on the database service.

Boolean Constraints on Method Arguments: In addition to constraints on service invocations modeled using composite rules and composite principles, one could impose data driven constraints on method argument values. For example, consider the composite roles $CR_8$=(employee, retail service) and $CR_9$=(retail manager, retail service). A method M for approving an order should be permitted for $CR_8$ only if the order cost is less the policy specified threshold c. If the order cost is greater the c, then only composite role $CR_9$ would be able to approve the order.

2.2 Separation of Duty Constraints

Composite roles abstract away the concrete principles (and service instances) that participate in an activity. We capture separation of duty (SoD) constraints on concrete principles using composite principles. Unlike a service invocation based constraint, a SoD constraint encompasses an activity. An activity is modeled as a temporally ordered sequence of service invocations; note that each of these service invocations is in turn associated with a composite principle making that invocation. Hence, an activity A is represented in BNF as:

$$A := CP^+$$

Temporal Constraint: In an order activity for example, a composite principle $CP^o_{app}$=($emp_1$ as employee, $rs_1$ as retail service) might have approved a customer order o. The specifications for an order activity state that before the order o is approved, its payment needs to be verified. Let us suppose that a composite principle $CP^o_{pay}$=($emp_1$ as employee, $rs_1$ as retail service) attempts to authorize the payment for order o. The temporal constraint that follows from the specification is that $CP^o_{pay}$ should precede $CP^o_{app}$.

Boolean Constraint: The SoD constraint on an order activity disallows an order approval if the concrete principle initiating the order approval and that initiating the payment authorization (for a given order) is the same. This SoD constraint can be easily expressed as Boolean constraints on the concrete principles in $CP^o_{app}$ and $CP^o_{pay}$. In the example described above, an order approval method call by $CP^o_{app}$ would fail since $CP^o_{app}.emp = CP^o_{pay}.emp = emp_1$. On the other hand, a composite principle $CP^o_{app}$=($emp_2$ as employee, $rs_1$ as retail service) attempting to approve an order o would succeed if $emp_1 \neq emp_2$.

Scope Constraints: SoD constraints typically span across multiple service invocations (multiple composite principles), but are all related to one scoped activity. In the above example, the scoped activity is a customer order that is scoped by a unique order identifier. A scoped SoD constraint is represented as the following Boolean constraint: $o_1 = o_2) \rightarrow CP^{o_1}_{app}.emp \neq CP^{o_2}_{pay}.emp$. Note that scoping ensures that an employee $emp_1$ can approve an order $o_1$ and authorize payment for an order $o_2$ as long as $o_1 \neq o_2$.

2.3 Inter-Organization Service Invocations

Simple Role Translation: We implement access control in inter-organizational web service invocations through role translation. An organization $org_1$ defines these role translations in the form of a table that maps a role $R_2$ in $org_2$ to some role $R_1$ that is understood by the access control service in $org_1$. Formally, this is represented as a mapping: $R_2^{org_2} \rightarrow R_1^{org_1}$. The role translation tables are stored at the organization's gateway. All requests from external organizations are routed through the gateway, which performs role translation before forwarding the web service invocation locally. For example, the retailer system may map a manufacturer M's inventory manager to a employee. This permits the manufacturer's inventory manager to inspect warehouse inventory levels and automatically push items to the warehouse.

Scoped Roles: In many instances, however, the translated role needs to be scoped by the identity of the organization the concrete principle belongs to. Formally, this is represented as a mapping: $R_2^{org_2} \rightarrow R_1^{org_1} <org_2>$. For example, a manufacturer M's inventory manager may be mapped by the retailer system to the role of a scoped employee: employee<M>. Scoping the translated role ensures that the role employee<M> has the status of a employee only for those items that are purchased by the retailer system from the manufacturer M. Such constraints on scoped roles can be represented as Boolean constraints on the scope.

3. Access Control Specification

Having described basic building blocks, we next present an access control specification language that integrates them with the goal of efficiently meeting the requirements discussed above in Section 1.

3.1 Specification Language

In Section 2, we modeled a composite principle as a temporally ordered sequence of principles or service instances that are responsible for a service invocation. Such temporally ordered structures may be viewed as finite models of linear temporal logic (LTL). In this embodiment of the invention, we specify access control policies using pure-past linear temporal logic based specification language (PPLTL).

The syntax of our access control language is specified by the following BNF for Kripke structures. Note that p is an atomic proposition. The operators $X^{-1}$ (last time) and S (since) are the past time temporal operators: $X^{-1}\Psi$ is true if and only if $\Psi$ were true in the previous time step and $\Psi_0 S \Psi_1$ is true if and only if $\Psi_1$ was true at some point in the past and $\Psi_0$ has been true at all points in time since $\Psi_1$ evaluated to false.

$$\Psi := p | \Psi_0 \vee \Psi_1 | \Psi_0 \wedge \Psi_1 | \neg \Psi | X^{-1}\Psi | \Psi_0 S \Psi_1$$

Let us for example consider a policy $P_1$:

a) An employee operating through the retail service can approve an order if the order cost is less than c.
b) A retail manager operating through the retail service can approve all orders.
c) A chief manager can approve all orders.
d) A manufacturer M's inventory manager has the same status as that of an employee in the retailer system.
e) A manufacturer M's inventory manager is scoped to operate only those items that are purchased by the retailer system from the manufacturer M.

The administrator encodes this policy into a PPLTL rule $\Psi$:

$$\Psi = (\Psi_1 \wedge \Psi_2) \vee \Psi_3 \vee \Psi_4$$

$\Psi_1 = ((F(\text{employee})\hat{} X(\text{retailservice})\hat{}(\text{ordercost}(\text{cost}, \text{thr}))$ $\Psi_2 = (F(\text{employee}<M>) \rightarrow (\text{manufacturer}(M)\hat{}\text{purchase}(\text{itemID},M))))$ $\Psi_3 = (F(\text{retailmanager})\hat{} X(\text{retailservice}))$ $\Psi_4 = F(\text{chiefmanager}))$

3.2 Policy Evaluation and Soundness

Policy Evaluation: Having described an access control specification language, we now consider the computational expenses incurred in verifying the truth or the falsity of an access control rule. The problem of verifying a policy with respect to a composite role (or a sequence of composite principles) is a model checking problem: does $CR \models \Psi$ hold? Model checking requires time complexity of $\Theta(|CR|*|\Psi|)$ and space complexity $2*(|\Psi|+1)$ bits. Note that $|CR|$ denotes the length of the composite role CR and $|\Psi|$ denotes the length PPLTL proposition $\Psi$.

Performance Enhancement: We provide access control module as a service that accepts a rule $\Psi$ and input CR and verifies whether or not $CR \models \Psi$. In such a scenario multiple services in an organization (say, retail service, warehouse service in the retailer system) may invoke a common access control service. The access control module is very likely to see queries that share a common composite role (or a subsequence of the composite role). Further, when the service invocations are deeply nested or recursive the size of the composite role $|CR|$ can grow arbitrarily large. Fortunately, one can model this problem as a dynamic model checking problem and efficiently solve it as follows: Let us suppose that $CR = x_1 x_2 \ldots x_N \models \Psi$, then does $CR' = x_1 x_2 \ldots x_N x_{N+1} \ldots x_{N+N'} \models \Psi$ for some $N' \geq 1$. We use the model checking algorithm to cache pre-computed results from $CR \models \Psi$. Our dynamic model checking algorithm uses a cache of size $2*(|\Psi|+1)$ bits (per formula $\Psi$) and a time complexity of $\Theta(N'*|\Psi|)$ (as against a time complexity of $\Theta((N+N')*|\Psi|)$ using the original model checking algorithm). Note that both the cache size and the verification time is independent of N, thereby making this approach feasible even on large and complex service compositions.

Policy Soundness: A policy $\Psi$ is sound if there exists some input string CR that satisfies it. Verifying the soundness of a policy $\Psi$ incurs a computation cost that is exponential in $|\Psi|$. In practice the size of a PPLTL formula is likely to be small; also, one typically checks the soundness of a policy $\Psi$ during policy deployment outside the application's critical path.

Role Monotone Property: In our access control policy specification language, we represent an organizational role hierarchy using propositional logic as follows: if role $R_1 \geq_R R_2$ then, $R_1 \rightarrow R_2$, where $\geq R$ denotes the domination operator in an organizational role hierarchy; for example, retail manager $\geq_R$ employee. We extend the notion of role hierarchy to a role monotone property on PPLTL formulae as follows. For any two composite roles $CR_1$ and $CR_2$ and a PPLTL formula $\Psi$ satisfies the role monotone property if and only if $((CR_1 \geq_R CR_2) \wedge (CR_2 \models \Psi)) \rightarrow (CR_1 \models \Psi))$.

Conservative Macros: The correctness of our soundness and role monotone checks depends on the macros (manufacturer, purchase, etc). For soundness checks, we assume that all macros evaluate to true. For role monotone checks, one can formally show that our check is correctness preserving if a macro is conservative. A macro is said to be conservative if its output is independent of the calling composite principle and the organizational role hierarchy. For example, manufacturer (M) and purchase(itemID, M) are conservative macros since their truth/falsity depends exclusively on M and itemID.

4. Access Control Enforcement

In this section, we describe an implementation of our access control module in an application overlay network (AON) hosting the SCM application. AON strongly advocates the idea of building middleware features as light-weight on-demand services. An application can dynamically discover and use these services as interoperability requirements are determined. A single logical application can itself be partitioned and managed across the network. By way of example, FIG. 1 can be considered as an AON based implementation of the SCM application. That is SCM application 100 may be realized as two AONs: retailer system 104 being one AON and manufacturer system 110 being the other AON. The retailer system has several nodes that host middleware functionality such as: binding/gateway service, audit/logging service, JavaScript engine as a service, database engine as a service and business logic services (retail service and warehouse services). Middleware services and business logic services in an AON environment are run in separate containers that provide the service with a suitable runtime. A collection of one or more containers are hosted by a thin server.

4.1 Access Control Service

Figure 2:
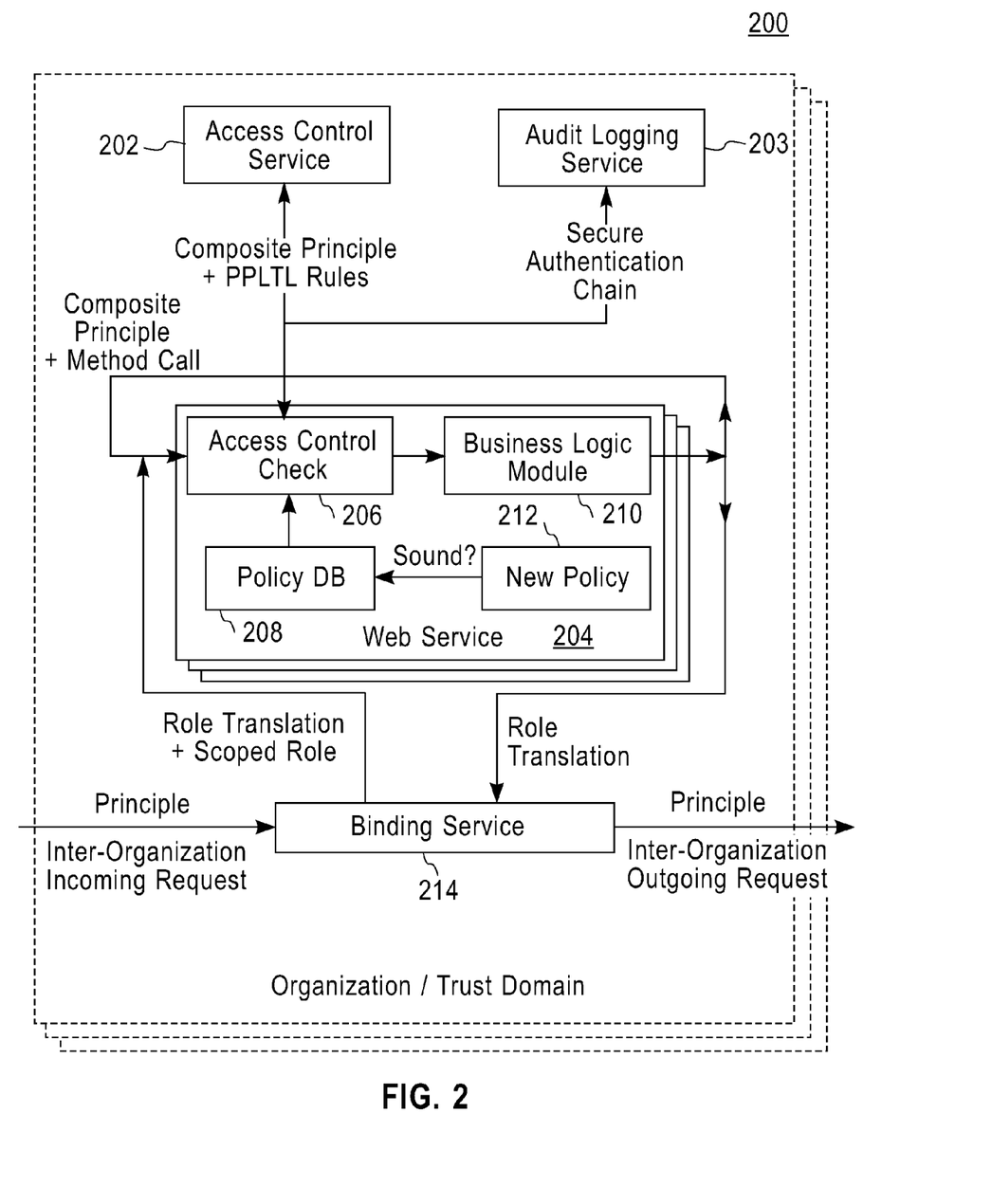
FIG. 2 illustrates an access control service according to an embodiment of the invention in an organization of an application overlay network.

FIG. 2 shows an illustrative implementation of the access control service of the invention in an organization (trust domain) of an AON. As shown, organization 200 includes access control service 202; audit logging service 203; web service 204 including access control check 206, policy database 208, business logic module 210 and new policy 212; and binding service 214. Function and interaction of these components are described below.

We preferably implement our access control module as a middleware feature that can be hosted as a service by the AON. We intercept incoming service invocations to a Web service at the access control check module on the container hosting the Web service. The access control check module invokes an access control service (possible hosted on an entirely different container and a thin server) to perform the required access control check. If the service invocation passes the access control check then the invocation is forwarded to the relevant business module. The access control service exports an interface as shown below. In the rest of this section, we describe how we obtain the values for each of arguments along with the modifications required to the underlying AON.

Boolean verify(AccessControlRule $\Psi$, CompositePrinciple CP, MethodSignature Sig, XMLOject input)
Boolean sound(AccessControlRule $\Psi$)
Boolean roleMonotone(AccessControlRule $\Psi$)

The policy database is encoded in the service description schema used by AON. We extend the service description schema to include one or more access control rules for every interface. The access control rule itself is a name and rule tuple, where name refers to the name of the operation/method and rule refers to the PPLTL rule that must be satisfied in order for an invocation on method name to be permissible. This framework achieves a clear separation and language independence between the application logic and the access control policy specification. The service description is made available to the container prior to deploying a service on that container.

The composite principle invoking a service is obtained by modifying the service containers in the AON infrastructure. Our implementation requires no changes to the application code. A service container in AON receives a request from a caller, triggers the service to process the request, and handles subsequent nested service invocations or returns to the caller. We instrument the service containers to construct a temporally ordered list of principles involved in a service invocation. This is achieved by using a token and accompanies a service invocation chain. The token is appended by the service container as the request flows through one or more hops on the AON. Hence, the composite principle invoking a service is available in the form of a token to the service container.

The access control service uses the database service to store and access the following pieces of information: a list of principles, a list of organizational roles, the organizational role hierarchy, and a table mapping a principle to its privilege (say, <john, employee> and <dan, retail manager>). The access control service may use database triggers to be notified when new users are added or when a user's privilege is changed.

However, for access control rules that span multiple composite principles (say, SoD constraint), the access control service uses the audit/logging service to obtain the composite principle(s) that have participated in the activity of interest in the past. We have modified the service container to log service invocations along with the scope name and scope ID making it efficient for us to retrieve relevant activity logs from the logging service. The service container infers a scope name from the policies in a service description. The scope ID is obtained from the argument values in the service invocation such that the argument name matches the scope name. The log format for a service invocation is shown below. For example, when a retail service invokes the database service on behalf of an employee to process a customer order, it is logged by the database service as follows: (db as database service) says (emp as employee, rs as retail service) invoked method processOrder on (db as database service) for activity (order}, 1234), where db is a service instance of type database service, order denotes the scope name and 1234 denotes the scope (order) ID. We keep the service invocation log temporally ordered and additionally build an index on (scopeName, scopeID) to allow fast access to relevant log entries.

(P as R|SI as S) says CP invoked method M on (SI as S) for activity (scopeName, scopeID)

The method signature sig contains a WSDL description of the invoked method's signature. The XMLObject input contains method invocation arguments. Coupled with the method signature sig, it enables the access control service to interpret the argument types and values in input. The sig and input parameters are required to support data-driven access control policies. Recall that a WSDL description of the invoked method is available at the container hosting the service since the service deployment stage. In the following sections, we describe how we deploy and enforce access control policies in our system.

4.2 Policy Deployment

We now describe techniques to deploy a new policy into the system. Let us consider a sample access control policy P1 (described in Section 2) and its PPLTL rule $\Psi$:

We deploy the policy $\Psi$ through the following steps:

1) The administrator checks the soundness and role monotone property of policy $\Psi$ using the access control service.

2) Given a policy $\Psi$ the administrator has to determine policy enforcement points (PEPs). In this case the administrator determines that the policy must be enforced at the processOrder operation by the retailer service and the binding service.

3) The administrator adds a new policy $\Psi$ as an XML component to the PEP's service description. Note that the policy $\Psi$ is stored along with the service description and not at the access control service.

4) The administrator adds a role translation rule to the gateway's policy DB. A role translation rule is a three tuple: the first column contains the organization name and the second column contains a role name in that organization and the third column contains the translated role. In this example a table entry would look like <PG, inventory manager, employee<PG>>, where PG is the manufacturer.

4.3 Policy Enforcement

The deployed access control policies are enforced as follows. When the retailer system's binding service receives a web service invocation on the method processOrder:

1) The binding service performs role translation. The translation is effected by replacing every occurrence of inventory manager in the composite principle with employee<PG>.

2) The binding service forwards the method invocation to the container hosting the retailer service. The service runtime looks up the service description to check if there are any rules associated with the operation processOrder. If so, it invokes the access control service with the following arguments: the composite principle CP, the rule $\Psi$, and the arguments contained in the call to the processOrder method and a reference to the WSDL description of the processOrder method.

Figure 3:
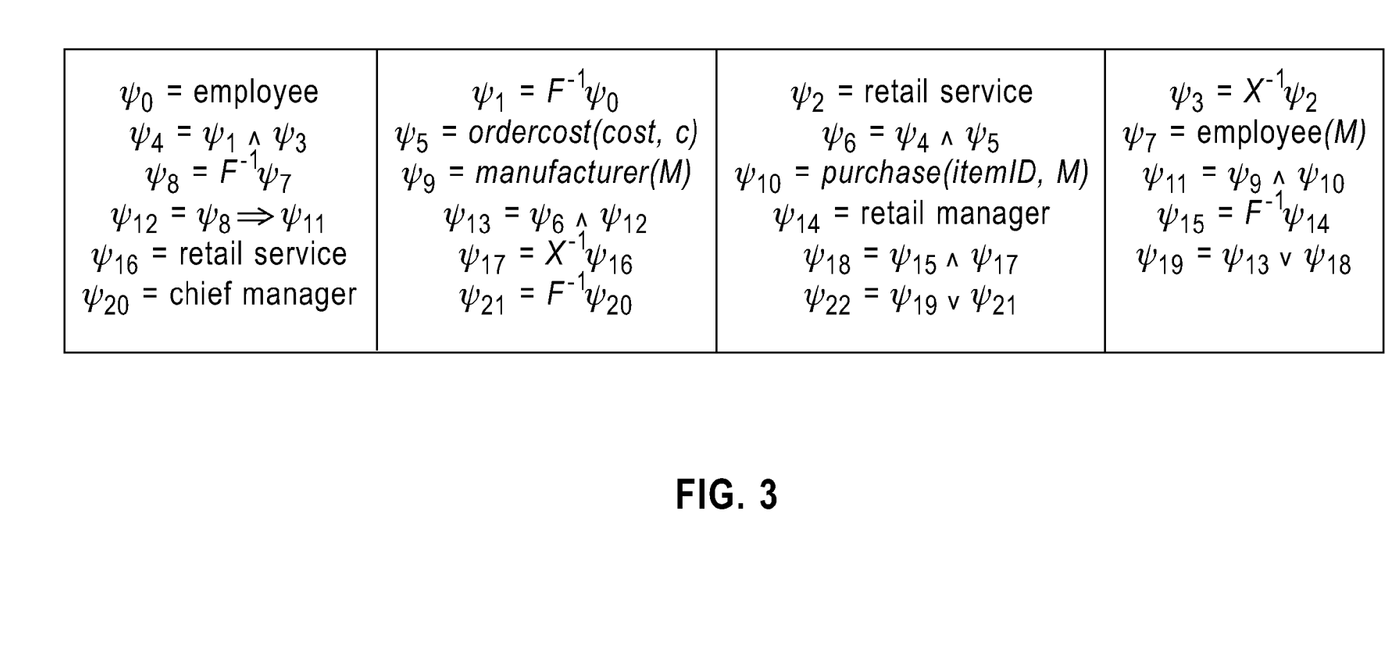
FIG. 3 illustrates atomic predicates of an access policy according to an embodiment of the invention.

3) If the rule is a scoped rule $\Psi^o$ (say, a separation of duty constraint) then the model checker dynamically instantiates a rule using the scope identifier from the input argument named o. The model checker parses the rule $\Psi$ (one linear scan) and breaks it down into atomic predicates. For the sample policy in \ref{sample-policy}, the atomic predicates are shown in FIG. 3. Note that the sample policy $\Psi=\Psi_{22}$. Given an atomic predicate it can be categorized into one of the following five types: a role or service (like employee, retail service), a scoped role (like employee<M>), Boolean operators (^, v, ¬, →), temporal operators ($F^{-1}$, $X^-$), and macros (ordercost, manufacturer, purchase).

a) A scoped role is used to extract the scope variable. The value for a scoped variable (if any) is obtained from a linear scan on the composite principle. In this case, the scope variable is M and its value is PG.

b) We evaluate macros using method calls that return a Boolean value. In this case there are three macros ordercost, manufacturer and purchase. We use reflection to determine the Java method from the macro name; then we pass arguments to these methods from three sources: (i) scope resolution (in this case, M=PG), (ii) arguments in the call on the processOrder method (in this case: cost, itemID), and (iii) policy specified constant (in this case, the cost threshold, c). Scope resolutions are handled as follows: ($i_a$) a scoped role is already inferred in step 3a, and ($i_b$) a scoped activity requires the access control service to lookup the logging service to identify past service invocations (composite principles) that have participated in the scoped activity. Argument names and types are extracted using a WSDL description of the processOrder method and the argument values from the web service invocation message. Constant types and values are extracted using a lexical analysis on the policy $\Psi$.

c) A role or a service is considered as an atomic literal. These literals are evaluated using the role hierarchy predicates. We use PPLTL to evaluate temporal operators. The Boolean operators are trivial to evaluate.

4) The access control service caches the required information required for performing dynamic model checking. This cached result is used to enhance the performance of future access control check requests arising primarily due to propagation of a service invocation and recursive service invocations.

5) If the access control service returns true, then the runtime forwards the method invocation to the retailer service; else the method invocation fails.

5. Authentication Methodologies and Computer System Architecture

Figure 4A:
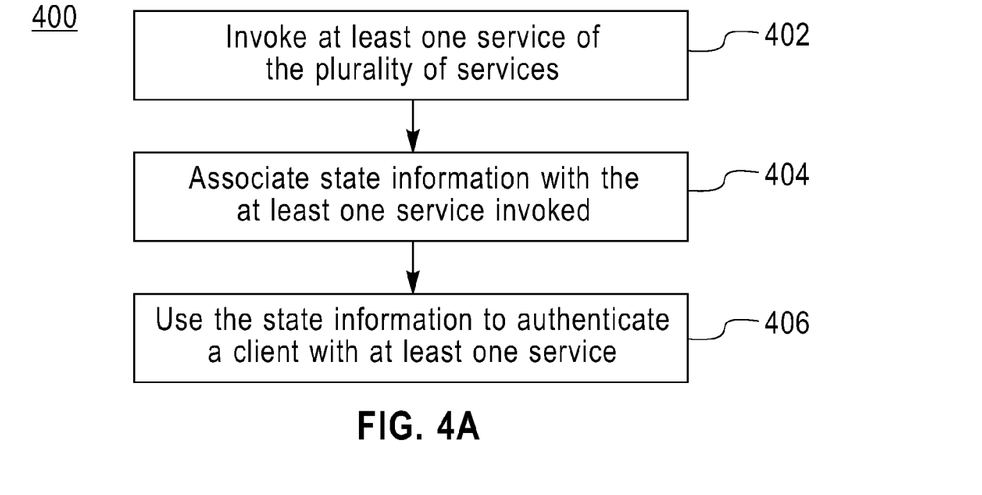
FIG. 4A illustrates a method for authenticating a client in a service-oriented environment according to an embodiment of the invention.

FIG. 4A shows one embodiment of a method for authenticating a client in a service-oriented environment, wherein the service-oriented environment includes a plurality of services.

As shown, methodology 400 includes the following steps. In step 402, at least one service of the plurality of services (204) is invoked. In step 404, state information is associated with the at least one service invoked. The state associated with a service invocation is stored in the form of a composite principles and the audit/logging service (203). In step 406, the state information is used to enforce access control on at least one service invocation. By way of example only, the access control verification step is carried out by the access control service (202) using the policies stored in policy database (208) and the state information stored in the audit/logging service (203).

Figure 4B:
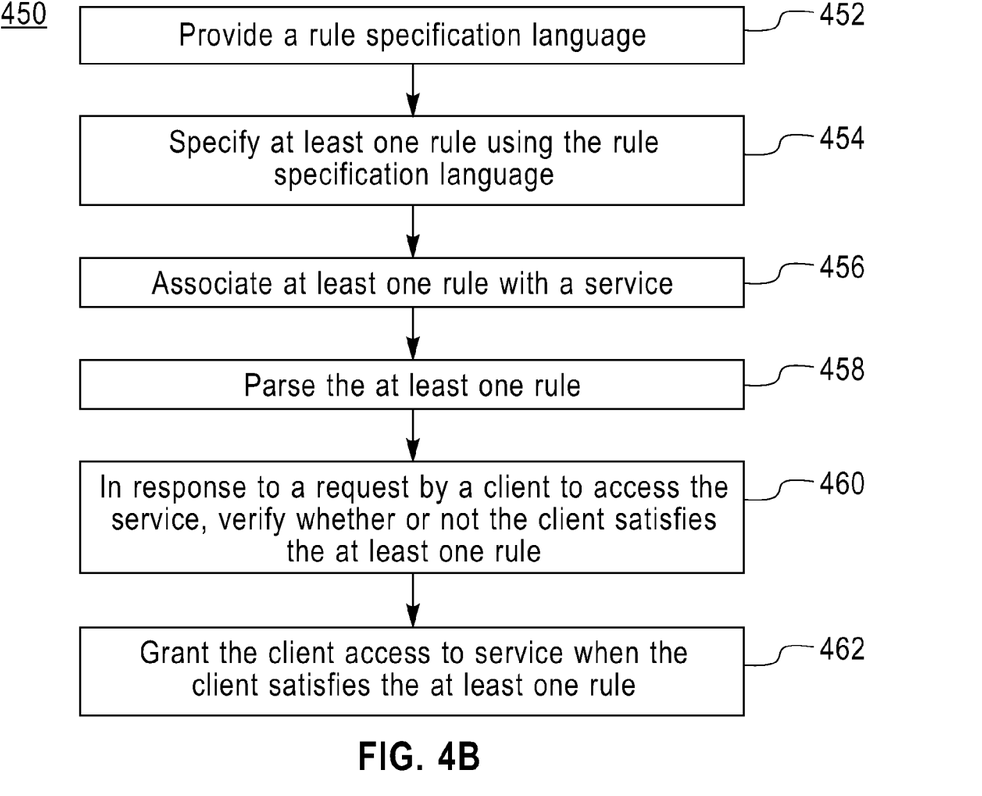
FIG. 4B illustrates a method for authenticating a client in a service-oriented environment according to another embodiment of the invention.

FIG. 4B shows another embodiment of a method for authenticating a client in a service-oriented environment, wherein the service-oriented environment includes a plurality of services.

As shown, methodology 450 includes the following steps. In step 452, a rule specification language is provided. For instance, we use a PPLTL based access control policy specification language (see Section 3.1). In step 454, at least one rule is specified using the rule specification language. An example policy expressed in a PPLTL based policy specification language in shown in FIG. 3. In step 456, at least one rule may be associated with a service. For example, such a rule (or rules) may be encoded into a policy database (208 in FIG. 2). In step 458, the at least one rule may be parsed. The access control service (202 in FIG. 2) parses a rule. In step 460, preferably in response to a request by a client to access the service, a verification is performed by the access control service (202) potentially using some state information from the logging service (203 in FIG. 2) to determine whether or not the client satisfies the at least one rule. In step 462, the client is granted access to a service when the client satisfies the at least one rule. At this point, the access control check module (206 in FIG. 2) may forward the service invocation to a relevant business logic module (210 in FIG. 2).

Figure 5:
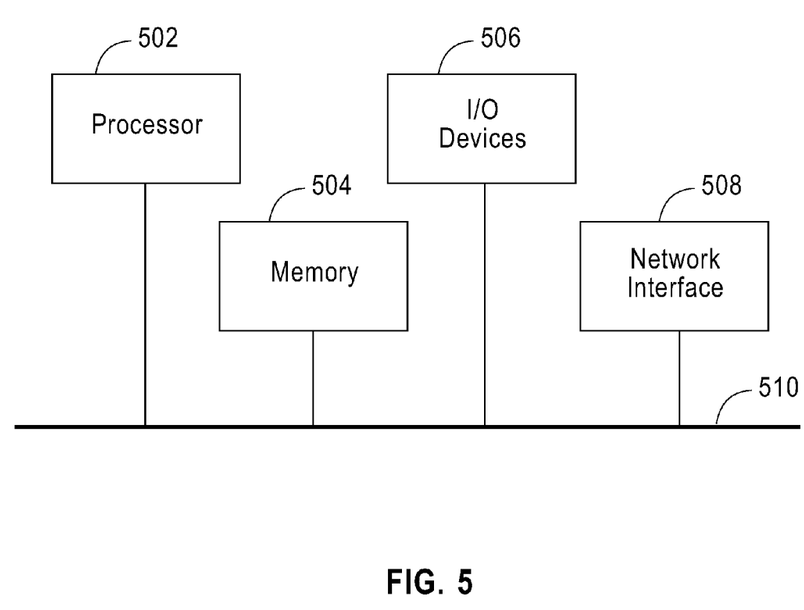
FIG. 5 illustrates processor and memory components of a computing device within which techniques of the invention may be implemented in accordance with an embodiment thereof.

Lastly, FIG. 5 depicts processor and memory components of a computing device within which principles of the invention may be implemented in accordance with an embodiment thereof. That is, FIG. 5 illustrates a computing device in accordance with which one or more components/steps of service composition access control techniques (e.g., components and methodologies described in the context of FIGS. 1 through 4B) may be implemented, according to an embodiment of the present invention. It is to be understood that the individual components/steps may be implemented on one such computing devices or on more than one such computing device. In the case of an implementation on a distributed computing system, the individual computer devices may be connected via a suitable network, e.g., the Internet or World Wide Web. However, the system may be realized via private or local networks. In any case, the invention is not limited to any particular network.

Thus, the computing device shown in FIG. 5 may represent one or more servers or one or more other processing devices capable of providing all or portions of the functions described herein.

As shown, computing system architecture 500 may include a processor 502, a memory 504, I/O devices 506, and a network interface 508, coupled via a computer bus 510 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a service-oriented environment comprising a plurality of services, a method for authenticating a client, the method comprising the steps:

a client invoking a composite service, the composite service comprising a plurality of different services and different principles, wherein the principles are entities that invoke the different services of the composite service;

maintaining state information comprising an identify of at least one service that is associated with the composite service; and using the state information to enforce access control on invocation of the at least one service, wherein at least a portion of the state information is stored in the form of a composite principle, wherein the composite principle comprises a temporally ordered sequence of the different principles that are responsible for nested invocation of the different services associated with the composite service, and wherein using the state information to enforce access control on invocation of the at least one service comprises:

obtaining one or more rules that are used to determine if the client can invoke the composite service, wherein the one or more rules define access control policies which are specified using a pure-past linear temporal logic based specification language having past time temporal operators, and which support a temporal predicate on the composite principle; and processing the one or more rules against the composite principle to verify whether invocation of the composite service by the client satisfies the one or more rules.

2. The method of claim 1, wherein at least a portion of the state information is stored in the form of an audit/logging service.

3. The method of claim 1, wherein the access control policies are stored in a policy database.

4. The method of claim 1, wherein the client is authenticated based on an access control decision.

5. The method of claim 4, wherein the access control decision is made in accordance with at least one temporal predicate on the composite principle.

6. The method of claim 4, wherein the access control decision is made in accordance with at least one scoped access control rule.

7. The method of claim 4, wherein the access control decision is made in accordance with at least one role translation.

8. The method of claim 4, wherein the access control decision is made in accordance with at least one scoped role.

9. The method of claim 4, wherein the access control decision is made in accordance with at least one Boolean predicate.

10. The method of claim 4, wherein the access control decision is made in accordance with at least one constraint.

11. The method of claim 10, wherein the at least one constraint comprises one or more of a role constraint, a privilege constraint, a Boolean constraint, a separation of duty constraint and a scope constraint.

12. An article of manufacture for authenticating a client in a service-oriented environment comprising a plurality of services, the article comprising a computer readable tangible storage medium containing one or more computer programs, which when executed implement the steps of claim 1.

13. In a service-oriented environment comprising at least one service, a method for access control, the method comprising the steps of:

providing a rule specification language, wherein said rule specification language is based on pure-past linear temporal logic having past time temporal operators;

specifying at least one rule using the rule specification language, wherein the rule is used for determining whether a client can access a composite service, the composite service comprising a plurality of different services and different principles, wherein the principles are entities that invoke the different services of the composite service;

verifying whether an invocation of the composite service by the client satisfies the at least one rule; and granting the client access to the composite service if the invocation of the composite service by the client satisfies the at least one rule, wherein said rule specification language supports a temporal predicate on at least one composite principle, wherein the composite principle comprises a temporally ordered sequence of the different principles that are responsible for nested invocation of the different services associated with the composite service.

14. The method of claim 13, wherein said rule specification language further supports at least one of: a scoped access control rule; a role translation; a scoped role, a Boolean predicate; a temporal constraint; a role constraint; a privilege constraint; a Boolean constraint; a separation of duty constraint, and a scope constraint.

15. An article of manufacture for authenticating a client in a service-oriented environment comprising a plurality of services, the article comprising a computer readable tangible storage medium containing one or more computer programs, which when executed implement the steps of claim 13.

16. Apparatus for authenticating a client in a service-oriented environment comprising a plurality of services, the apparatus comprising:
a memory; and
at least one processor coupled to the memory and operative to:
invoke a composite service, the composite service comprising a plurality of different services and different principles, wherein the principles are entities that invoke the different services of the composite service;
maintain state information comprising an identify of at least one service that is associated with the composite service; and
use the state information to enforce access control on invocation of the at least one service,
wherein at least a portion of the state information is stored in the form of a composite principle, wherein the composite principle comprises a temporally ordered sequence of the different principles that are responsible for nested invocation of the different services associated with the composite service, and
wherein in using the state information to enforce access control on invocation of the at least one service, the at least one processor is further operative to:
obtain one or more rules that are used to determine if the client can invoke the composite service, wherein the one or more rules define access control policies which are specified using a pure-past linear temporal logic based specification language having past time temporal operators, and which support a temporal predicate on the composite principle; and
process the one or more rules against the composite principle to verify whether invocation of the composite service by the client satisfies the one or more rules.

17. Apparatus for access control in a service-oriented environment comprising a plurality of services, the apparatus comprising:
a memory; and
at least one processor coupled to the memory and operative to:
provide a rule specification language, wherein said rule specification language is based on pure-past linear temporal logic having past time temporal operators;
specify at least one rule using the rule specification language, wherein the rule is used for determining whether a client can access a composite service, the composite service comprising a plurality of different services and different principles, wherein the principles are entities that invoke the different services of the composite service;
verify whether an invocation of the composite service by the client satisfies the at least one rule; and
grant the client access to the composite service if the invocation of the composite service by the client satisfies the at least one rule,
wherein said rule specification language supports a temporal predicate on at least one composite principle, wherein the composite principle comprises a temporally ordered sequence of the different principles that are responsible for nested invocation of the different services associated with the composite service.

* * * * *